United States Patent [19]

Machida et al.

[11] Patent Number: 5,801,888

[45] Date of Patent: *Sep. 1, 1998

[54] HIGH MAGNIFICATION ZOOM LENS BARREL INCLUDING A DRIVE RING HAVING A SHORT LENGTH TO PROVIDE A COMPACT CAMERA

[75] Inventors: Kiyosada Machida, Urawa; Junichi Omi, Kawasaki, both of Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 584,148

[22] Filed: Jan. 11, 1996

[30] Foreign Application Priority Data

Feb. 8, 1995 [JP] Japan ............................. 7-020768

[51] Int. Cl.⁶ .......................................... G02B 15/14
[52] U.S. Cl. ........................... 359/694; 359/699; 359/701
[58] Field of Search .............................. 359/694, 699, 359/701

[56] References Cited

U.S. PATENT DOCUMENTS 5,144,493  9/1992  Nomura ..................... 359/700
5,198,932  3/1993  Takamura .
5,307,103  4/1994  Machida ................... 354/195.1
5,329,329  7/1994  Fukushima ............... 354/195.12
5,485,315  1/1996  Nomura ..................... 359/701

*Primary Examiner*—Georgia Y. Epps
*Assistant Examiner*—Evelyn A. Lester

[57] ABSTRACT

A high magnification zoom lens barrel including a drive ring having a short length in the optical axis direction to permit a compact camera configuration. The zoom lens barrel includes a first lens group support member to support a first lens group, and a second lens group support member to support a second lens group. The drive ring advances and withdraws the first lens group support member in the optical axis direction as the drive ring itself advances or withdraws in the optical axis direction as it rotates. The drive ring drives the first lens group support member with helicoids. A drive cam member is driven by the drive ring to rotate so that as the drive cam member rotates, it advances and withdraws the second lens group support member relative to the first lens group support member. A second drive ring is inserted into the drive cam member and rotates relative to the drive ring and is able to move in unison with the drive ring in the optical axis direction.

18 Claims, 6 Drawing Sheets

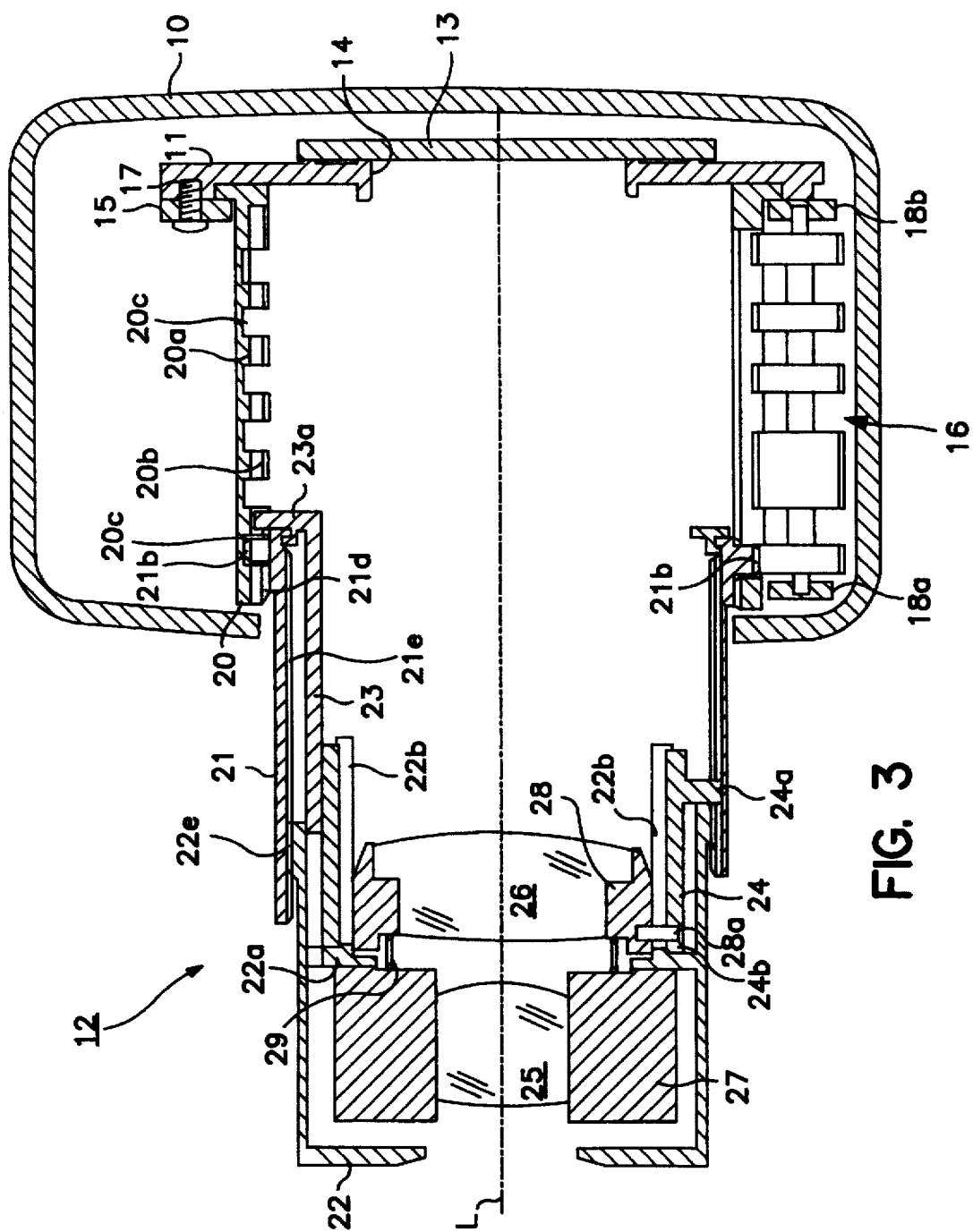

HIGH MAGNIFICATION ZOOM LENS BARREL INCLUDING A DRIVE RING HAVING A SHORT LENGTH TO PROVIDE A COMPACT CAMERA

BACKGROUND OF THE INVENTION

1. Field of the Invention

The present invention relates to a zoom lens barrel having a zoom photographic lens comprising multiple lens groups for performing telephoto/wide angle photography by appropriately driving the multiple lens groups, and, more particularly, the present invention relates to a zoom lens barrel having a short length drive ring to drive the zoom photographic lens and to make the camera more compact.

2. Description of the Related Art

Compact cameras having zoom lenses are known. The zoom lens allows a photographer to zoom from telephoto to wide angle photography by adjusting the zoom lens. The conventional zoom lens typically includes multiple lens groups which are incorporated in the zoom lens barrel. The zooming operation is performed by advancing and withdrawing the lens groups in the optical axis direction by varying amounts of movement, thereby changing the distance between the lens groups to change the focal length from telephoto to wide angle. Further, compact cameras which retract the zoom lens into the camera body have become common in response to demands for smaller and thinner cameras.

However, in the conventional zoom lens, the movement of the first lens group in the optical axis direction is limited by the length of a drive ring which advances and withdraws the first lens group in the optical axis direction. Therefore, when it is required to move the lens a great distance, such as with a high magnification zoom, a drive ring having a long length in the optical axis direction is required. As a result, a problem arises in that camera compactness can not be achieved.

More particularly, when both camera compactness and a high magnification zoom are desired, the length of the drive ring in the optical axis direction is determinative of whether high-magnification zoom can be obtained. Further, a "collapsible" camera, where the zoom lens is retracted into the camera body, can not be achieved when the drive ring has a long length.

SUMMARY OF THE INVENTION

It is an object of the present invention to provide a high-magnification zoom lens.

It is another object of the present invention to provide a lens barrel including a drive ring having a short length to drive the lens groups in the optical axis direction to make the camera compact and thin.

Additional objects and advantages of the invention will be set forth in part in the description which follows, and, in part, will be obvious from the description, or may be learned by practice of the invention.

Objects and advantages of the present invention are achieved with a zoom lens barrel having a first lens group supported by a first lens group support member, a second lens group supported by a second lens group support member so that the second lens group is able to move in the optical axis direction relative to the first lens group, a drive ring to advance and withdraw the first lens group support member in the optical axis direction by a first drive device, comprising a cam or a helicoid, and a drive cam member which is driven by the drive ring to rotate around the optical axis as the drive ring advances and withdraws the first lens group support member, and which advances and withdraws the second lens group support member in the optical axis direction relative to the first lens group support member. The drive ring is connected to a fixed cylinder in the lens barrel by a second drive device, comprising a cam or a helicoid, and the drive ring itself advances and withdraws in the optical axis direction in conjunction with the rotation around the optical axis. Further, a second drive ring is operably connected to the drive ring so that it rotates around the optical axis relative to the first drive ring and moves in unison with the first drive ring in the optical axis direction and is attached to the fixed cylinder so that it is able to move in the optical axis direction.

In accordance with embodiments of the present invention, as the first lens group support member, which supports the first lens group, is advanced and withdrawn in the optical axis direction by rotating the drive ring, the drive ring itself advances and withdraws in the optical axis direction, and through the drive cam member which is rotated along with the drive ring, the second lens group support member, which supports the second lens group, advances and withdraws in the optical axis direction as the drive cam member is rotated, thereby changing the focal length from telephoto to wide angle. As the drive ring moves in the optical axis direction, the second drive ring also moves in unison in the optical axis direction, and drive ring rotation and movement in the optical axis direction become possible. Further, the drive cam member advances and withdraws the second lens group support member in the optical axis direction together with the first lens group support member so that the second lens group moves with respect to the first lens group by the amount of the difference in the amount of movement with respect to the first lens group.

BRIEF DESCRIPTION OF THE DRAWINGS

These and other objects and advantages of the present invention will become apparent and more readily appreciated from the following description of the preferred embodiments, taken in conjunction with the accompanying drawings, of which:

FIG. 3 is a cross-sectional diagram of a camera having a zoom lens barrel in the telephoto condition in accordance with embodiments of the present invention.

DETAILED DESCRIPTION OF THE PREFERRED EMBODIMENTS

Figure 1:
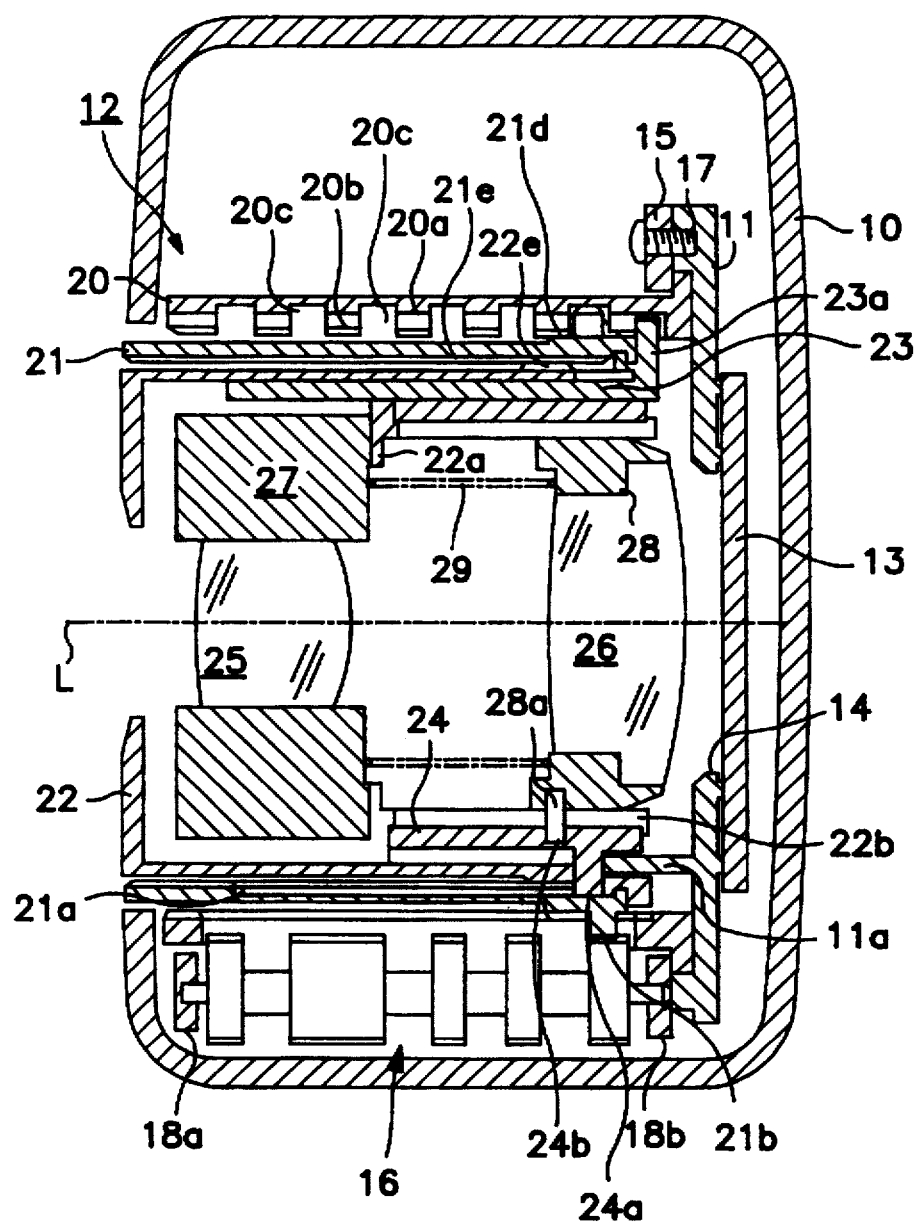
FIG. 1 is a cross-sectional diagram of a camera having a zoom lens barrel in a collapsed condition in accordance with embodiments of the present invention.

Reference will now be made in detail to the preferred embodiments of the present invention, examples of which are illustrated in the accompanying drawings wherein like reference numerals refer to the same or similar elements throughout.

Figure 2:
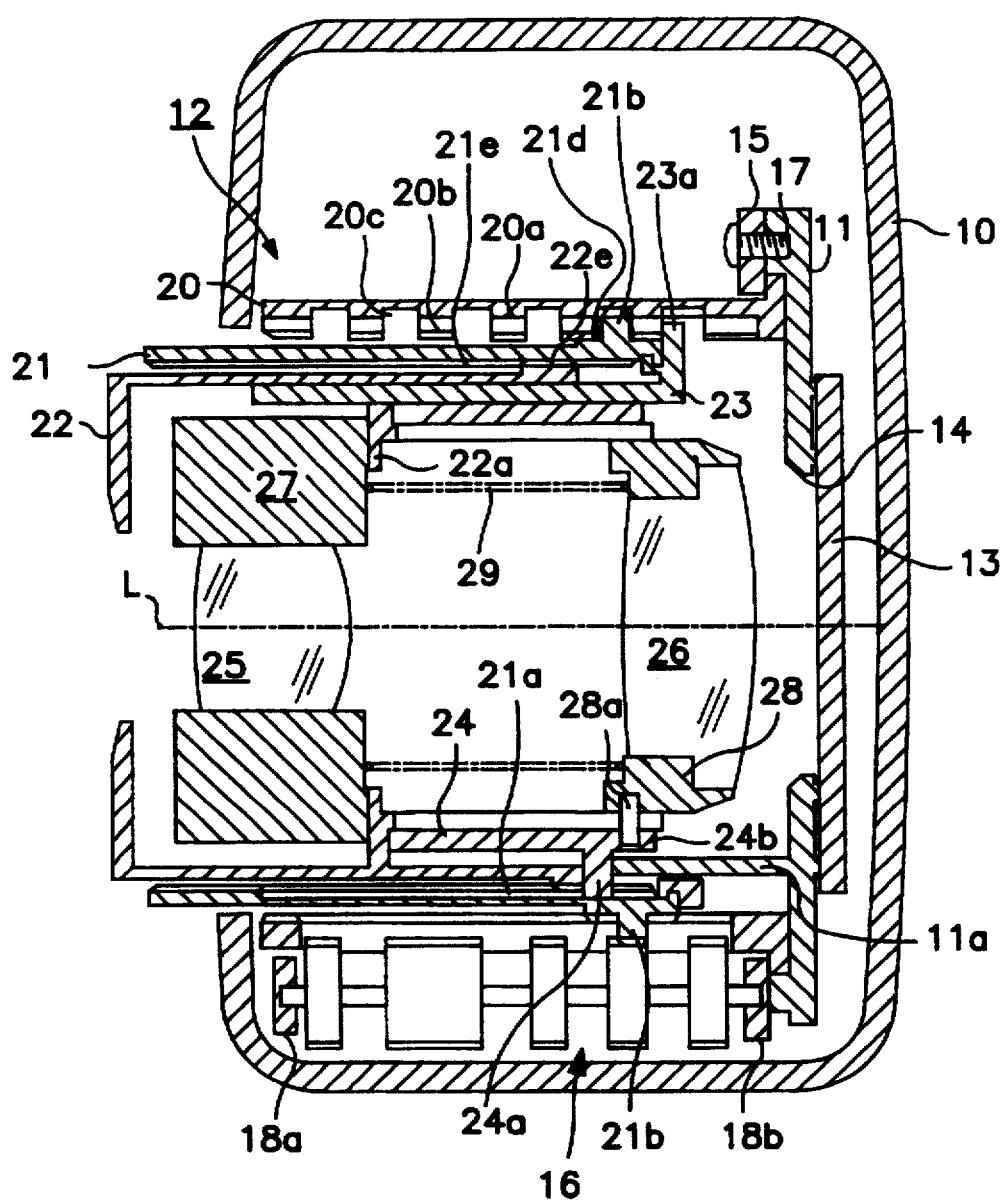
FIG. 2 is a cross-sectional diagram of a camera having a zoom lens barrel in a wide angle condition in accordance with embodiments of the present invention.

The lens barrel in accordance with embodiments of the present invention will now be described with reference to FIGS. 1-3. FIGS. 1-3 are cross-sectional diagrams of a camera having a zoom lens barrel in a collapsed position, a wide angle position and a telephoto position, respectively, in accordance with embodiments of the present invention.

As shown in FIGS. 1-3, a camera body 10 includes a zoom lens barrel 12 attached to an inner portion 11 of the camera body 10. The zoom lens barrel 12 can be extended from the camera body 10 and retracted or collapsed into the camera body 10 through a center opening in a front surface of the camera body 10.

An aperture 14 through which light passes to expose a recording medium (not shown), such as film, is formed approximately in the center of the inner portion 11 of the camera body 10. A pressure plate 13 is positioned at the rear side of the aperture 14 such that the pressure plate 13 forms a film path on which photographic film travels.

The zoom lens barrel 12 includes a fixed cylinder 20 (alternatively referred to as a fixed member) which is secured as a unit to the front side of the inner portion 11 of the camera body 10 and extends in an optical axis L direction. A helicoid ring 21 is attached to and inserted helicoidally into the fixed cylinder 20. The helicoid ring 21 acts as a drive ring which advances and withdraws a first lens group support member 27 (described in detail later) in the optical axis L direction.

A lens barrel main body 22 is inserted helicoidally into the inner circumference of the helicoid ring 21. A linear ring 23 is arranged on the film plane side of the helicoid ring 21. The linear ring 23 is able to move in unison with the helicoid ring 21 in the optical axis direction, and is able to rotate freely relative to the helicoid ring 21. A zoom lens cam ring 24 is arranged inside the lens barrel main body 22 and rotates in conjunction with the rotation of the helicoid ring 21.

The zoom lens barrel 12 includes a first lens group 25 and a second lens group 26 which form a photographic optical system zoom lens. The first lens group 25 and the second lens group 26 are arranged inside the lens barrel main body 22 and are movable in the optical axis direction. The first lens group 25 is supported by a first lens group support member 27 and the second lens group is supported by a second lens group support member 28. The lens support members 27 and 28 form a shutter section into which the lens shutter mechanisms (not shown) are incorporated. The optical axis of lens groups 25 and 26 is represented by long and short dashed line L in the figures.

The linear ring 23 acts as a second drive ring in accordance with embodiments of the present invention. The linear ring 23 is able to move in the optical axis L direction in unison with the helicoid ring 21 and provides relative rotational displacement in the rotation direction. The linear ring 23 includes a protrusion 23a to restrict rotation of the linear ring 23. Specifically, the protrusion 23a fits into a linear groove 20a in the fixed cylinder 20 to restrict the rotation of the linear ring 23. The linear groove 20a is parallel to the optical axis L.

The zoom lens cam ring 24 fits into the outer circumference of a guide 22a in the lens barrel main body 22 so that the zoom lens cam ring 24 rotates freely. The zoom lens cam ring 24 includes a protrusion 24a on its outer circumference which fits into a linear groove 21a of the helicoid ring 21. The linear groove 21a is parallel to the optical axis L. The zoom lens cam ring 24 rotates in conjunction with the rotation of the helicoid ring 21 via the outer circumference protrusion 24a fitting into the linear groove 21a.

As shown in FIGS. 1-3, the fixed cylinder 20 comprises an inner circumference helicoid 20b which meshes with an outer circumference helicoid 21d of the helicoid ring 21. Further, the fixed barrel 20 comprises a spiral groove 20c formed at the inner circumference of the fixed barrel 20 along with the inner circumference helicoid 20b. As shown in FIGS. 1 and 3, the spiral groove 20c prevents interference with a spiral gear 21b formed at the outer circumference of the helicoid ring 21. The spiral gear 21b moves in the optical axis direction while rotating. The helicoid ring 21 comprises an inner circumference helicoid 21e which meshes with an outer circumference helicoid 22e formed in the outer circumference of the lens barrel main body 22.

A drive transmission device including a drive gear 16 meshes with the spiral gear 21b and transmits driving force from a drive device, such as an electric motor (not shown), attached inside the camera body 10. The zooming operation is performed by advancing and withdrawing the first lens group 25 and the second lens group 26 along the optical axis L direction. The extension or retraction (collapsing) operation of lens barrel 12 is performed when the drive transmission device including drive gear 16 drives the helicoid ring 21, linear ring 23, lens barrel main body 22 and zoom cam ring 24. In accordance with embodiments of the present invention, a multi-gear configuration is used in which multiple gears are attached on the same axis as the drive gear 16. However, the present invention is not limited to such a gear configuration. For example, gears with the same diameter dimensions may also be formed in the optical axis direction.

A holding member 15 holds down a back end flange of the fixed cylinder 20 to the front surface of the inner portion 11 of the camera body 10. A screw 17 secures the holding member 15 to the inner portion 11 of the camera body 10. Further, support members 18a and 18b support both ends of a gear shaft of the drive gear 16, and the support members 18a and 18b are secured to the inner portion 11 of the camera body 10 by a securing mechanism (not shown).

The lens support member 28 which holds the second lens group 26 includes multiple guide pins 28a protruding from the outer circumference of a back end of the lens support member 28. The multiple guide pins 28a are inserted into guide grooves 22b in the guide 22a of the lens barrel main body 22. The guide grooves 22b are parallel with the optical axis L on the circumference of the guide 22a of the lens barrel main body 22, and regulate the motion stroke as they regulate the rotation of the second lens group 26.

A compression coil spring 29 is positioned between the lens support member 27 and the lens support member 28 and imparts energy to the second lens group 26 toward the film plane (i.e., the rear surface side of the camera body 10). The compression coil spring 29 prevents wobbling.

Cam grooves 24b for advancing and withdrawing the second lens group 26 are formed circumferentially and at a specified angle with respect to the optical axis L in the zoom cam ring 24. The front ends of the guide pins 28a, which are inserted into the guide grooves 22b, are inserted into the cam grooves 24b. The second lens group 26 is advanced and withdrawn along the guide grooves 22b in the guide 22a of the lens barrel main body 22.

In accordance with embodiments of the present invention, the lens barrel main body 22 is advanced and withdrawn in the optical axis L direction by rotation of the helicoid ring 21 which acts as a drive ring and is advanced and withdrawn in the optical axis L direction. The lens support member 27 which supports the first lens group 25 is also advanced and withdrawn in the optical axis L direction along with the lens barrel main body 22. The lens support member 28 which supports the second lens group 26 is advanced and withdrawn in the optical axis L direction by rotation of the zoom cam ring 24. The zoom cam ring 24 is rotated along with the helicoid ring 21, via the cam connection of guide pins 28a, linear grooves 22b and cam grooves 24b, thereby performing zooming from telephoto to wide angle.

In accordance with embodiments of the present invention, the amount of movement of the first lens group 25 during zooming is the sum of the amount of movement of the barrel main body 22 with respect to the helicoid ring 21 and the amount of movement of the helicoid ring 21, itself, with respect to the fixed barrel 20. Thus, in accordance with embodiments of the present invention, the length of the helicoid ring 21 in the optical axis direction can be shortened. High-magnification zooming can be performed while advantageously maintaining the length of the helicoid ring 21 at a minimum. As a result of maintaining the length of the helicoid ring 21 at a minimum, the camera body 10 which accommodates the helicoid ring 21 and the lens barrel main body 22 can be made thinner and therefore more compact.

The above-noted advantages are exhibited when the camera is collapsible. However, these advantages are not limited to a collapsible camera, and also result with other types of cameras.

Figure 4C:
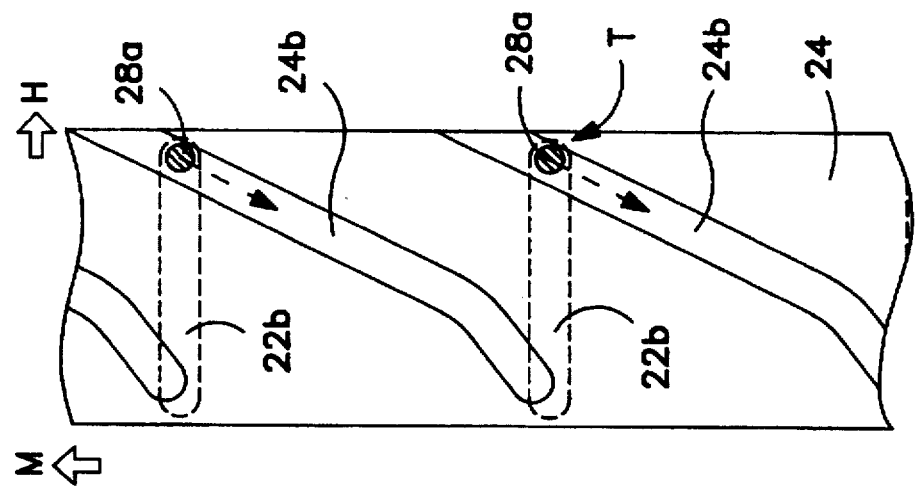
FIG. 4C is a diagram of a zoom cam ring showing the cooperation between guide pins, guide grooves and cam grooves when the zoom lens barrel is in a telephoto position in accordance with embodiments of the present invention.

FIG. 3 is a cross-sectional diagram of a camera having a zoom lens barrel 12 in a telephoto position. FIG. 4C shows the cooperation of the guide pins 20a, guide grooves 22b and cam grooves 24b when the zoom lens barrel 12 is in the telephoto position in accordance with embodiments of the present invention.

As shown in FIG. 4C, when the zoom lens barrel 12 is in the telephoto position, the guide pins 28a are positioned at the telephoto position T on the photographic subject side of the guide grooves 22b, where the arrow H indicates the direction of the photographic subject.

Figure 4B:
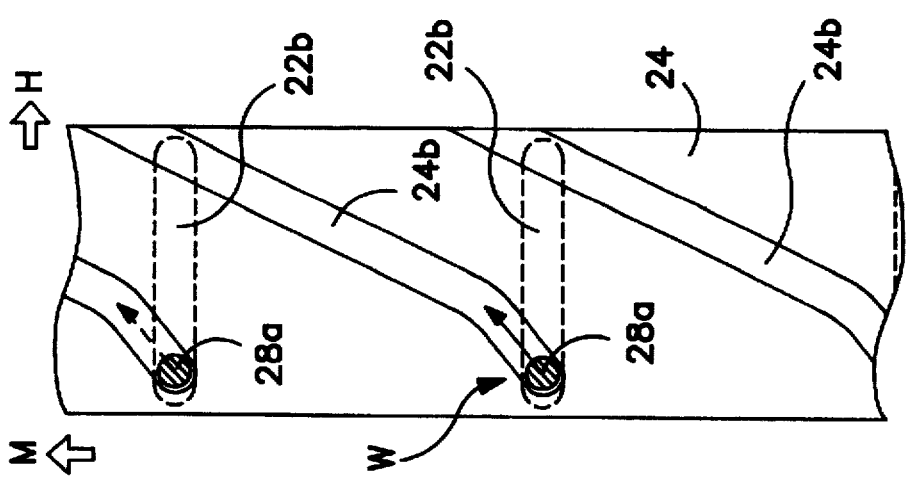
FIG. 4B is a diagram of a zoom cam ring showing the cooperation between guide pins, guide grooves and cam grooves when the zoom lens barrel is in a wide angle position in accordance with embodiments of the present invention.
Figure 4A:
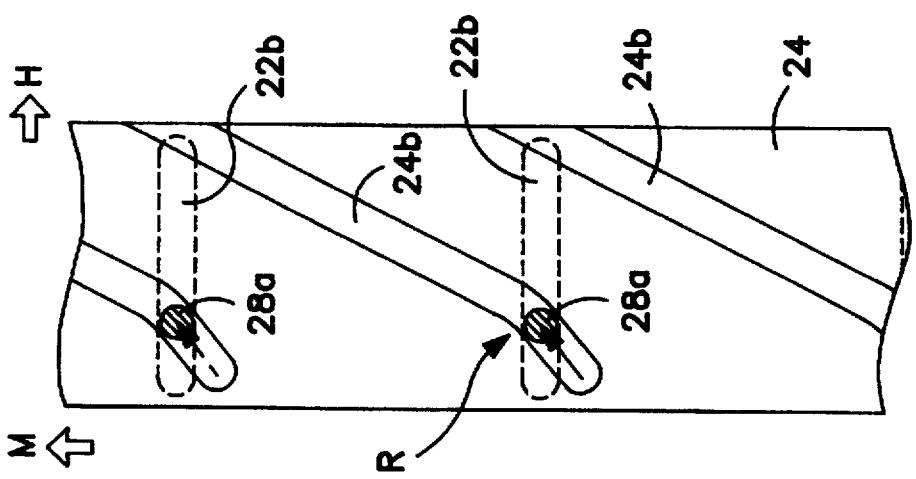
FIG. 4A is a diagram of a zoom cam ring showing the cooperation between guide pins, guide grooves and cam grooves when the zoom lens barrel is in a collapsed position in accordance with embodiments of the present invention.

From the position of the lens barrel shown in FIG. 3 and FIG. 4C, when the drive device (not shown) is driven, the helicoid ring 21 is rotated in the retraction direction, and the zoom cam ring 24 rotates in conjunction with the helicoid ring 21 in the direction of the arrow M shown in FIGS. 4A–4C. The rotation of the zoom cam ring 24 causes cam grooves 4b to move in the upward direction in FIGS. 4A–4C (i.e., the direction of the arrow M). As a result of the upward movement of the cam grooves 24b, the guide pins 28a are pressed by the groove walls of the cam grooves 24b. The pressing force of the cam grooves 24b causes the guide pins 28a to move along the guide grooves 22b in the direction of the film plane (i.e., a direction opposite that of arrow H in FIGS. 4A–4C).

As shown in FIG. 4B, the movement of the zoom cam ring 24 causes the guide pins 28a to move from the telephoto position T to the wide angle position W on the film plane side of the guide grooves 22b, resulting in the wide angle condition shown in FIG. 2.

Figure 6:
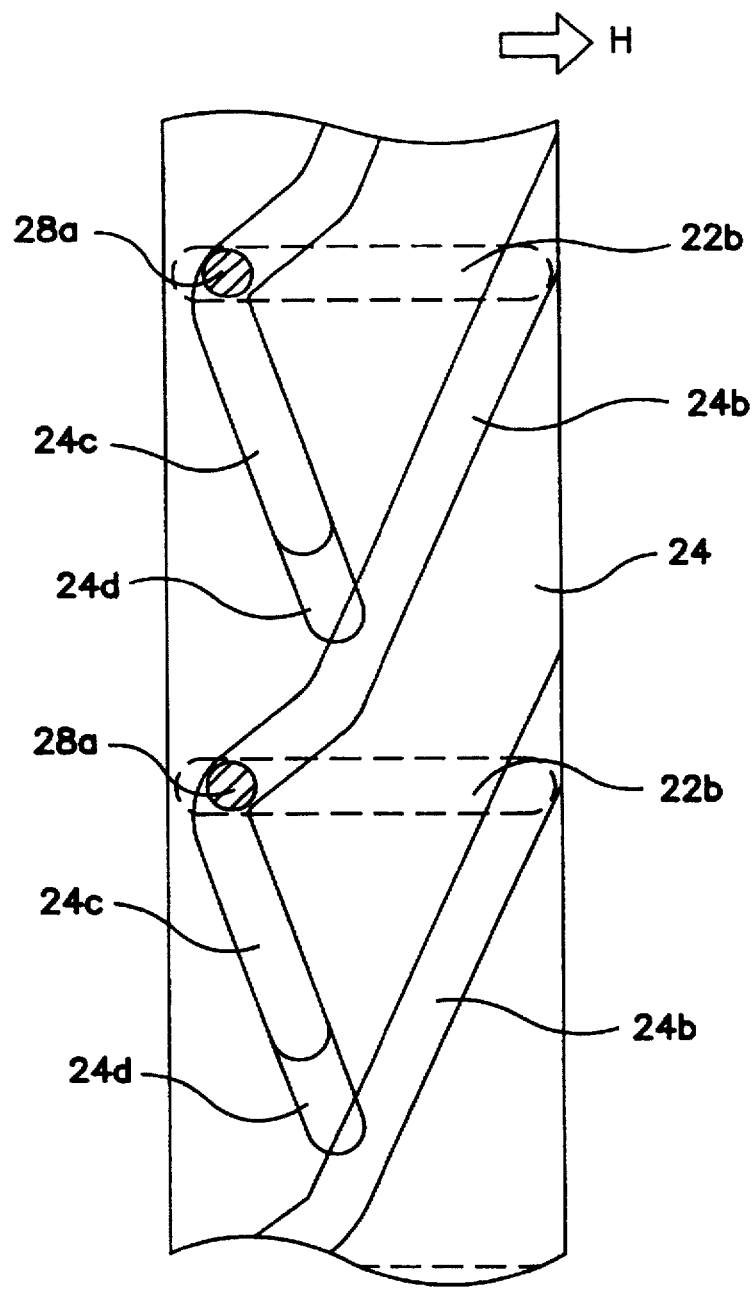
FIG. 6 is a diagram of a conventional zoom cam ring having collapsing cam grooves for a drive mechanism for adjustment of a zoom lens barrel of a camera.

In the conventional zoom lens barrel, shown in FIG. 6, the zoom cam ring 24 includes "collapsing" cam grooves 24c formed continuously on the film plane side of cam grooves 24b. To perform the retraction (collapsing) operation of the lens barrel, as shown in FIG. 6, the collapsing cam grooves 24c are formed toward the subject side (the direction of arrow H in the figure). To make the conventional camera more compact, it is necessary to make the incline angle of the cam grooves 24b at the outer circumference of the zoom cam ring 24 gradual and long, causing the collapsing cam grooves 24c to extend as shown by 24d in FIG. 6. Extending the cam grooves 24d causes the cam grooves 24d to interfere with the other cam grooves 24b, thus, making it difficult to achieve compactness of the camera.

In accordance with the present invention, as is clear from FIGS. 4A–4C, there is no collapsing area in cam grooves 24b, and a collapsing operation such as that explained below is performed. Because there is no collapsing area in the cam grooves in accordance with the present invention, compactness of the camera can be easily achieved.

Specifically, when the guide pins 28a are positioned in the telephoto position T and the wide angle position W, respectively, as shown in FIGS. 4C and 4B, the protrusion 24a of the zoom cam ring 24 fits into the linear groove 21a of the helicoid ring 21. Therefore, when zooming down (moving the zoom lens from the telephoto to the wide angle position), the zoom cam ring 24 rotates along with the helicoid ring 21. In conjunction with the rotation of the zoom cam ring 24, the guide pins 28a move along the guide grooves 22b toward the film plane side (i.e., opposite the arrow H), which also causes the second lens group 26 to move toward the film plane side. When the retracting operation continues, as shown in FIG. 5A, the protrusion 24a of the zoom cam ring 24 strikes a slanted surface 11b of a protrusion 11a from the inner portion 11 of the camera body 10.

Figure 5A:
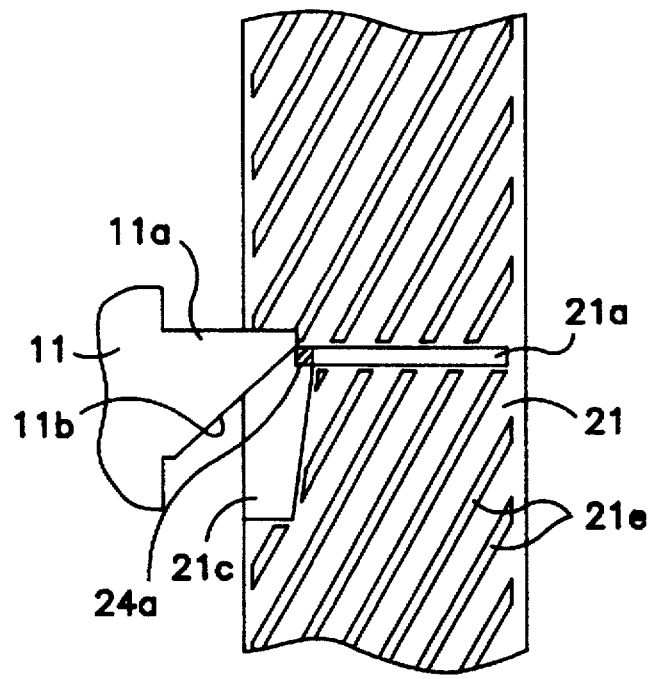
FIG. 5A is a diagram illustrating a relationship between a protrusion of a zoom cam ring and a protrusion of the camera body when the lens barrel is in a wide angle position and begins retraction to a collapsed position in accordance with embodiments of the present invention.
Figure 5B:
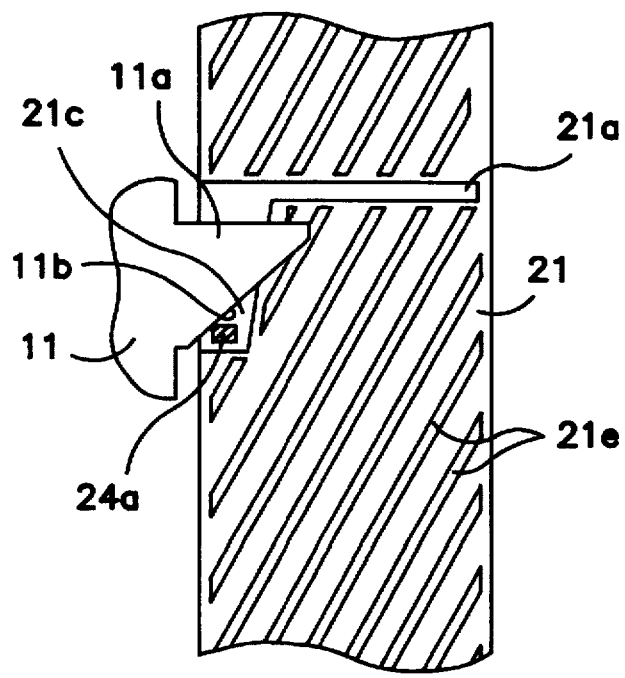
FIG. 5B is a diagram illustrating the relationship between a protrusion of a zoom cam ring and a protrusion of the camera body when the lens barrel is in a collapsed position in accordance with embodiments of the present invention.

Referring to FIG. 5A, when the zoom lens barrel 12 begins retracting from the wide angle position to the collapsed position, the protrusion 24a of the zoom cam ring 24 strikes a slanted surface 11b of the protrusion 11a of the inner portion 11 of the camera body 10. The protrusion 24a then moves to a position which corresponds to a roll off 21c of the linear groove 21a in the helicoid ring 21. As a result, the zoom cam ring 24 is not restricted by the rotation of the helicoid ring 21. Therefore, as the barrel main body 22, the helicoid ring 21 and the zoom cam ring 24 move toward the film plane side, they move along the slanted surface 11b of the protrusion 11a of the camera main body 11, resulting in a collapsed condition such as that shown in FIG. 5B. Thus, when the zoom lens barrel 12 moves from the wide angle position to the collapsed position, the zoom cam ring 24 is rotated in a direction reverse to the rotation during movement of the zoom lens 12 from the collapsed position to the wide angle position. Accordingly, as shown in FIG. 4A, the guide pins 28a use the telephoto side of cam grooves 24b as collapsing cam grooves, and the guide pins 28a move along the cam groove walls to the collapsed position R in the direction of the subject.

In contrast, when the lens barrel main body 22 is extended, the above-described operation is reversed. In particular, movement of the zoom lens barrel 12 from the collapsed position (FIG. 1) to the wide angle position (FIG. 2) is achieved by imparting energy to the second lens group 26 and the lens support member 28 in the film plane direction with the compression coil spring 29. Specifically, during movement of the zoom lens 12 to the wide angle position, the guide pins 28a of the lens holder 20 attempt to move the cam grooves 24b in the in the upward direction through the energy imparted by the compression coil spring 29. The guide pins 28a are pressed by the groove walls of the cam grooves 24b, and through that pressing force, the protrusion 24a of the zoom cam ring 24 is pressed against the slanted surface 11b of the protrusion 11a of the inner portion 11 of the camera body 11.

Moreover, when the extension of the zoom lens barrel 12 continues past the wide angle condition, the protrusion 24a of the zoom cam ring 24 is moved from the slanted surface 11b of the protrusion 11a to the linear groove 21a, resulting in the telephoto condition shown in FIGS. 3 and 4C.

Thus, in accordance with the embodiments of the present invention described above, it is not necessary to use the undesirable collapsing cam grooves of the conventional zoom lens shown in FIG. 6. Specifically, by driving the zoom cam ring 24 in a rotation direction which is the same as the drive direction when moving the zoom lens from the telephoto position to the wide angle position, the second lens group 26 is brought as a close as possible to the first lens group 25, and the lens barrel main body 22 is collapsed inside the camera body 10. Therefore, in accordance with embodiments of the present Invention, it is not necessary to use the coil-shaped collapsing cam grooves of the conventional camera.

The present invention is not limited to the structure described with respect to the embodiments shown in FIGS. 1-5, and it is possible to appropriately change and modify the shapes and structures of the respective mechanisms inside the camera, such as the zoom lens barrel 12. For example, the embodiments of the present invention have been described as having two lens groups, 25 and 26, which form the photographic optical system. However, the present invention is not limited to a system having two lens groups, and may be applied to a system having more than two lens groups.

Further, the embodiments of the present invention were described with respect to a lens barrel 12 applied to a collapsible camera. The present invention is not limited in application to a collapsible camera, and may also be employed in a camera where the extension and retraction amount is increased to make the zooming range larger.

In accordance with the embodiments of the invention described above, the zoom lens barrel 12 includes a first lens group 25 having a first lens group support member 27 to support the first lens group 25, a second lens group 26 having a second lens group support member 28 to support the second lens group 26 so that the second lens group support member 28 is able to move in the optical axis direction relative to the first lens group support member 27. A drive ring, comprising a cam or helicoid, is driven by a drive device to advance and withdraw the first lens group support member 27 in the optical axis direction. A drive cam member is driven by the drive ring to rotate around the optical axis so that the drive cam member rotates freely around the optical axis and advances and withdraws the second lens group support member 28 in the optical axis direction relative to the first lens group support member 27. The drive ring is connected to a fixed cylinder of the lens barrel main body by a second drive device, comprising a cam or helicoid, and the drive ring itself advances and withdraws in the optical axis direction conjunction with the rotation around the optical axis.

In accordance with embodiments of the present invention, as the first lens group support member, which supports the first lens group 25, is advanced and withdrawn in the optical axis direction by rotation of the drive ring, the drive ring itself is advanced and withdrawn in the optical axis direction. The second lens group support member, which supports the second lens group 26, is advanced and withdrawn in the optical axis direction as the drive ring rotates by a drive cam member which is rotated along with the drive ring. In accordance with embodiments of the present invention, the amount of movement of the first lens group 25 during zooming may be set as the amount of movement of the first lens group support member 27 with respect to the drive ring and the amount of movement of the drive ring itself with respect to the fixed cylinder.

Accordingly, the length of the drive ring in the optical axis direction can be kept short, and high magnification zooming becomes possible. As a result, there is an advantage in that a thinner and more compact camera can be achieved.

Although preferred embodiments of the invention have been shown and described, it will be appreciated by those skilled in the art that changes may be made in these embodiments without departing from the principles and spirit of the invention, the scope of which is defined in the appended claims and their equivalents.

What is claimed is:

1. A zoom lens system having multiple lens groups, comprising:

a first lens group;

a first lens group support member to support the first lens group, the first lens group support member being movable in an optical axis direction;

a second lens group;

a second lens group support member to support the second lens group such that the second lens group is movable in the optical axis direction relative to the first lens group;

a first drive ring operably coupled to the first lens group support member and rotatable around the optical axis to advance and withdraw the first lens group support member in the optical axis direction; and a cam ring having cam grooves, operably coupled to the first drive ring and to the second lens group support member via the cam grooves, the cam ring being rotated around the optical axis by the rotation of the first drive ring to advance and withdraw the cam ring in the optical axis direction, wherein the second lens group support member includes guide pins which fit in the cam grooves of the cam ring to advance and withdraw only the second lens group support member in the optical axis direction relative to the first lens group support member by rotation of the cam ring, wherein the first drive ring advances and withdraws in the optical axis direction as the first drive ring rotates around the optical axis.

2. A zoom lens system as recited in claim 1, further comprising a fixed cylinder, wherein the first drive ring is a helicoid ring having an outer circumference helicoid and the fixed cylinder comprises an inner circumference helicoid meshing with the outer circumference helicoid, and wherein the first drive ring advances and withdraws in the optical axis direction with respect to the fixed cylinder as the first drive ring rotates.

3. A zoom lens system as recited in claim 1, wherein the first drive ring includes a linear groove and the cam ring includes an outer circumference protrusion fitting into the linear groove, and wherein the cam ring rotates with the rotation of the first drive ring via the linear groove and outer circumference protrusion.

4. A zoom lens system as recited in claim 2, further comprising:
   a second drive ring operably coupled to the first drive ring and to the fixed cylinder to rotate around the optical axis relative to the first drive ring and to move in the optical axis direction in unison with the first drive ring and rotating freely around the optical axis relative to the cam ring.

5. A zoom lens system as recited in claim 2, wherein an amount of movement of the first lens group is the sum of an amount of movement of the first lens group support member with respect to the first drive ring and an amount of movement of the first drive ring with respect to the fixed cylinder.

6. A zoom lens system as recited in claim 1, further comprising:
   a lens barrel main body inserted into an inner circumference of the first drive ring, wherein the first lens group support member is contained within the lens barrel main body and the lens barrel main body is advanced and withdrawn in the optical axis direction by rotation of the first drive ring.

7. A zoom lens system as recited in claim 6, wherein the first drive ring includes a helicoid on an inner circumference of the first drive ring, and the lens barrel main body includes a helicoid on an outer circumference of the lens barrel main body which meshes with the inner circumference helicoid of the first drive ring.

8. A zoom lens system as recited in claim 6, wherein the second lens group support member includes multiple guide pins protruding from an outer circumference of the second lens group support member and the lens barrel main body includes guide grooves in parallel with the optical axis into which the multiple guide pins are inserted.

9. A zoom lens system as recited in claim 1, wherein the first drive ring comprises one of a cam and a helicoid to drive the first lens group support member.

10. A zoom lens system as recited in claim 2, wherein the first drive ring includes one of a cam and a helicoid to couple the first drive ring to the fixed cylinder.

11. An optical device, comprising:
    a fixed member;
    a first lens group having an optical axis;
    a second lens group having an optical axis;
    a rotatable drive ring operatively coupled to the fixed member, to the first lens group, and to the second lens group to move the first lens group in an optical axis direction, and to move the second lens group relative to the first lens group when the rotatable drive ring is rotated; and
    a cam ring rotatably driven by the rotatable drive ring and operatively coupled to the second lens group to move only the second lens group relative to the first lens group when the rotatable drive ring rotates.

12. An optical device as recited in claim 11, wherein the first lens group is moved by an amount corresponding to a sum of the amount of movement of the first lens group with respect to the rotatable drive ring and an amount of movement of the rotatable drive ring with respect to the fixed member.

13. An optical device as recited in claim 11, wherein the optical device is a camera.

14. A zoom lens system, comprising:
    a fixed cylinder extending in an optical axis direction;
    a first drive ring operably coupled to the fixed cylinder and rotatable within the fixed cylinder to advance and withdraw in the optical axis direction within the fixed cylinder;
    a lens barrel main body inserted into an inner circumference of the first drive ring and operably coupled to the first drive ring, the lens barrel main body being rotated around the optical axis by rotation of the first drive ring to advance and withdraw the lens barrel main body in the optical axis direction;
    a second drive ring operably coupled to the first drive ring and to the fixed cylinder and rotatable relative to the first drive ring and movable in unison with the first drive ring in the optical axis direction;
    a cam ring located within the lens barrel main body and operably coupled to the first drive ring, the cam ring being rotated around the optical axis by the rotation of the first drive ring to advance and withdraw the cam ring in the optical axis direction;
    a first lens group located within the lens barrel main body;
    a first lens group support member to support the first lens group, operably coupled to the lens barrel main body and which is advanced and withdrawn in the optical axis direction along with the lens barrel main body;
    a second lens group located within the lens barrel main body;
    a second lens group support member to support the second lens group, operably coupled to the cam ring, and which is advanced and withdrawn in the optical axis direction by rotation of the cam ring,
    wherein the rotation of the first drive ring drives the second drive ring, the lens barrel main body, and the cam ring.

15. A zoom lens system, as recited in claim 14, wherein the amount of movement of the first lens group is the sum of the amount of movement of the lens barrel main body with respect to the first drive ring and the amount of movement of the first drive ring with respect to the fixed cylinder.

16. A zoom lens system having multiple lens groups, comprising:
    a first lens group;
    a first lens group support member to support the first lens group, the first lens group support member being movable in an optical axis direction;
    a second lens group;
    a second lens group support member to support the second lens group such that the second lens group is movable in the optical axis direction relative to the first lens group;
    a first drive ring operably coupled to the first lens group support member and rotatable around the optical axis to advance and withdraw the first lens group support member in the optical axis direction, wherein the first drive ring advances and withdraws in the optical axis direction as the first drive ring rotates around the optical axis;
    a cam ring having cam grooves, operably coupled to the first drive ring and to the second lens group support member via the cam grooves, the cam ring being rotated around the optical axis by the rotation of the first drive ring to advance and withdraw the cam ring in the optical axis direction, wherein the second lens group support member includes guide pins which fit in the cam grooves of the cam ring to advance and withdraw the second lens group support member in the optical axis direction relative to the first lens group support member by rotation of the cam ring;

a fixed cylinder having an inner circumference helicoid; and a second drive ring operably coupled to the first drive ring and to the fixed cylinder to rotate around the optical axis relative to the first drive ring and to move in the optical axis direction in unison with the first drive ring and rotating freely around the optical axis relative direction in unison with the first drive ring and rotating freely around the optical axis relative to the cam ring, wherein the first drive ring is a helicoid ring having an outer circumference helicoid meshing with the inner circumference helicoid of the fixed cylinder, and wherein the first drive ring advances and withdraws in the optical axis direction with respect to the fixed cylinder as the first drive ring rotates.

17. A zoom lens system having multiple lens groups, comprising:

a first lens group;

a first lens group support member to support the first lens group, the first lens group support member being movable in an optical axis direction;

a second lens group;

a second lens group support member to support the second lens group such that the second lens group is movable in the optical axis direction relative to the first lens group;

a first drive ring operably coupled to the first lens group support member and rotatable around the optical axis to advance and withdraw the first lens group support member in the optical axis direction, wherein the first drive ring advances and withdraws in the optical axis direction as the first drive ring rotates around the optical axis;

a cam ring having cam grooves, operably coupled to the first drive ring and to the second lens group support member via the cam grooves, the cam ring being rotated around the optical axis by the rotation of the first drive ring to advance and withdraw the cam ring in the optical axis direction, wherein the second lens group support member includes guide pins which fit in the cam grooves of the cam ring to advance and withdraw the second lens group support member in the optical axis direction relative to the first lens group support member by rotation of the cam ring; and a lens barrel main body inserted into an inner circumference of the first drive ring, wherein the first lens group support member is contained within the lens barrel main body and the lens barrel main body is advanced and withdrawn in the optical axis direction by rotation of the first drive ring, wherein the first drive ring includes a helicoid on an inner circumference of the first drive ring, and the lens barrel main body includes a helicoid on an outer circumference of the lens barrel main body which meshes with the inner circumference helicoid of the first drive ring.

18. A zoom lens system having multiple lens groups, comprising:

a first lens group;

a first lens group support member to support the first lens group, the first lens group support member being movable in an optical axis direction;

a second lens group;

a second lens group support member to support the second lens group such that the second lens group is movable in the optical axis direction relative to the first lens group;

a first drive ring operably coupled to the first lens group support member and rotatable around the optical axis to advance and withdraw the first lens group support member in the optical axis direction, wherein the first drive ring advances and withdraws in the optical axis direction as the first drive ring rotates around the optical axis;

a cam ring having cam grooves, operably coupled to the first drive ring and to the second lens group support member via the cam grooves, the cam ring being rotated around the optical axis by the rotation of the first drive ring to advance and withdraw the cam ring in the optical axis direction, wherein the second lens group support member includes guide pins which fit in the cam grooves of the cam ring to advance and withdraw the second lens group support member in the optical axis direction relative to the first lens group support member by rotation of the cam ring; and a lens barrel main body inserted into an inner circumference of the first drive ring, wherein the first lens group support member is contained within the lens barrel main body and the lens barrel main body is advanced and withdrawn in the optical axis direction by rotation of the first drive ring, wherein the second lens group support member includes multiple guide pins protruding from an outer circumference of the second lens group support member and the lens barrel main body includes guide grooves in parallel with the optical axis into which the multiple guide pins are inserted.

* * * * *